H. P. KRAFT.
NUT FOR BOLTS OR THE LIKE.
APPLICATION FILED JULY 25, 1914.

1,281,174.

Patented Oct. 8, 1918.

WITNESSES:
Rene'Bruine
Fred White

INVENTOR:
Henry P. Kraft,
By Attorneys,
Fraser, Turk & Myers

UNITED STATES PATENT OFFICE.

HENRY P. KRAFT, OF RIDGEWOOD, NEW JERSEY.

NUT FOR BOLTS OR THE LIKE.

1,281,174. Specification of Letters Patent. Patented Oct. 8, 1918.

Application filed July 25, 1914. Serial No. 853,127.

*To all whom it may concern:*

Be it known that I, HENRY P. KRAFT, a citizen of the United States of America, residing in Ridgewood, in the county of Bergen and State of New Jersey, have invented certain new and useful Improvements in Nuts for Bolts or the like, of which the following is a specification.

This invention relates to nuts for bolts or the like, and aims to provide certain improvements therein.

The invention is applicable to nuts of any description, although in the preferred form illustrated it is particularly adapted for nuts for use in connection with dust caps for pneumatic tire valves.

Nuts for use on pneumatic tire valves are usually provided with a body portion having a recess for receiving a packing washer and an interior thread adapted to engage the screw-thread on the valve shell. When adapted to receive a cap, a screw-threaded extension is usually formed on the nut. By reason of the depth of the nut it is expensive to form it out of a solid bar of metal, and this is particularly true when an extension is provided which increases the length of the nut. According to the present invention there is provided a nut formed of sheet metal, which nut is provided with a recess adapted to receive a packing washer. According to the present invention there is provided a nut formed of sheet metal which has a body portion and a cylindrical portion, the cylindrical portion being preferably of smaller diameter than the body portion whereby there is formed a recess adapted to receive a packing washer. If thin metal is used and a cylindrical portion is provided with inner and outer threads, this would undesirably weaken the structure. To avoid this, where two threads are required, the nut is formed with two thicknesses of material at its screw-threaded parts. Such nuts are provided with a wrench face in the form of flats, knurls, or the like, and when this wrench face is sufficiently broad to become efficient, the recess in the nut becomes so deep that the leather or other washers of ordinary thickness are not deep enough to extend beyond the lower face of the nut. According to the present invention I provide a nut having a filling piece preferably formed of sheet metal which forms a rest or seat for the washer, and lengthens it so that its face extends beyond the lower face of the nut, so that it may be effectively used. Certain other features of improvement are also provided.

Referring to the drawings which illustrate several forms of the invention,—

Figure 1:
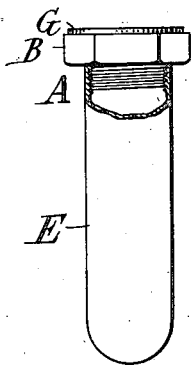
Figure 1 is a side elevation of one form of nut applied to a dust cap for tire valves.
Figure 2:
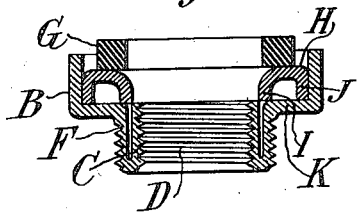
Fig. 2 is a diametrical section of the nut.
Figure 5:
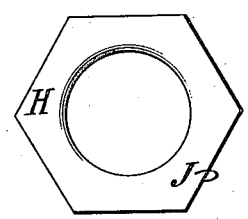
Fig. 5 is a top view of the filler.
Figure 6:
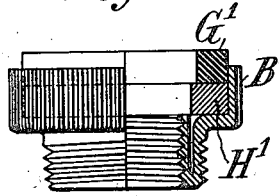
Fig. 6 is a view partly in elevation and partly in section, illustrating the use of a solid filler.

Referring to the drawings, let A indicate the nut as a whole which is preferably formed with a body portion B which may be of hexagonal form as shown in Figs. 1 and 2, or of round form as shown in Fig. 6, or any other suitable shape. The nut is in the construction shown in Figs. 1 to 6 formed with an extension or neck C of smaller diameter than the body portion, which as shown is screw-threaded on its interior at D to engage a bolt, valve shell or other screw-threaded part. When the nut is designed to be used in connection with a valve cap, such as is shown at E, it is provided with an exterior screw-thread F upon which the valve cap screws.

The body portion B is adapted to bear either directly or indirectly against a wheel felly or rim or some other part, and by reason of its cup formation is extremely stiff and rigid. It hence does not require metal of any considerable thickness in order to adequately sustain the strains in use. If the extension C is made of a single thickness of such metal, the cutting of the threads D and F would leave too little material for the strength required. It is hence desirable to increase the thickness of the metal at this point, particularly where a double thread is used. According to the present construction the extension C is made of two thicknesses of sheet metal which may lie close together, or may be separated to some extent if desired. In the construction shown in Figs. 1 to 6 the metal forming the top of the nut is extended inwardly until it lies parallel with the exterior of the extension, as best shown in Fig. 2.

Figure 4:
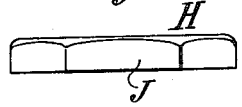
Fig. 4 is an elevation of the filler.
Figure 3:
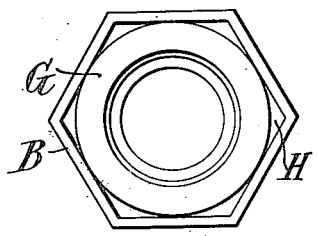
Fig. 3 is a top view.

It is desirable in some instances to provide a packing ring or washer G for the nut, and this may be formed of a suitable thickness of leather or rubber, or other material. If the body portion B is designed to have a considerable depth in order that it may be engaged by a wrench, or in order that a secure finger-hold may be obtained, as in Fig. 6, it is found that the recess thus formed in the body portion when metal of suitable thinness is used is deeper than the thickness of a leather or other usual washer, so that the washer fails to project beyond the face of the nut. Under these circumstances it is desirable to provide a filling piece H. According to the present invention this is best formed of sheet metal, and best comprises an annular member with an inner flange I and an outer flange J which rest upon the portion K of the nut. The packing washer G in turn rests upon the filler. Preferably in the case of a hexagonal nut the outer edge of the filler is similarly formed as shown in Figs. 4 and 5 while its iner edge or opening is preferably round. In either hexagonal or other nuts, however, it is usually desirable to form the packing washer G of circular shape as best seen in Fig. 3, since this shape is less liable to become distorted when the nut is screwed up.

In forming the improved nut it is preferable to start with a flat piece of metal which is gradually cupped to form the extension, and the bottom of the cup is pressed in a contrary direction by a series of operations until it projects inwardly sufficiently to form the inturned portion of the extension. At a suitable point in the operation the bottom of the cup is perforated in order to assist the formation. By preference the extension is practically completed before the circular flange is drawn into hexagonal or round form. The filler H is formed with a comparatively loose fit and after it has been adjusted in place, it may be given an inward blow with a punch or hammer, thus expanding it sufficiently to tightly grip the interior wall of the body of the nut. No other method of connection is usually necessary. The packing washer G contacting at several points around the interior periphery of the body of the nut is held in place by friction with sufficient firmness.

Figure 7:
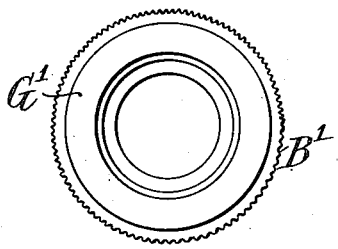
Fig. 7 is an under plan view of Fig. 6.

In Figs. 6 and 7 is illustrated a nut having a round body portion B' which is preferably knurled in order to provide a finger grip or wrench faces. In this construction a solid filling piece H' is provided, while the packing washer G' may be circular as before.

Figure 8:
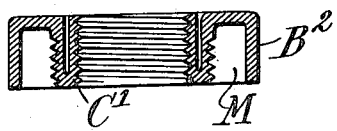
Fig. 8 is a diametrical section of a modified form of nut.

In Fig. 8 is illustrated a form of nut in which the extension C' is formed within the body $B^2$ of the nut. In this construction the extension may be screw-threaded on both sides as illustrated, or one of these sides may be left unthreaded. In this construction an annular recess M is provided which may receive a filling piece and packing washer, or either alone.

Figure 9:
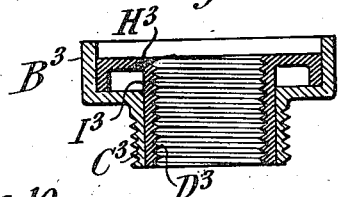
Fig. 9 is a diametrical section of a further modification.

In Fig. 9 a modification is shown wherein the extension $C^3$ is formed partly integral with the body $B^3$ and partly integral with the filling piece $H^3$, the inturned flange $I^3$ of the latter being in this case continued downwardly to form the sleeve $D^3$. In this construction the parts may be connected by solder or the like, or the parts may be jammed together tightly under pressure. If the nut body is of hexagonal or other non-circular outline and the filling piece is of similar outline, the parts will be adequately secured against relative rotary motion. The filling piece may be given a blow in the same manner as described with reference to Fig. 2, so as to swage it down slightly, thus causing it to grip the interior of the body portion.

Figure 10:
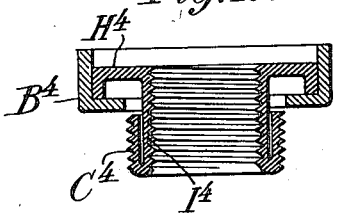
Fig. 10 is a diametrical section of a further modification.

In Fig. 10 the body portion $B^4$ is not formed integrally with the screw-threaded extension, but the latter, indicated by the reference letter $C^4$, is formed on the filling piece $H^4$ by forming a sleeve on the flange $I^4$ which is turned outwardly in this case instead of inwardly as in Fig. 2. In this construction it is preferable to make the outer thickness of metal as short as possible.

In either of the constructions shown the filling piece may be brought out to the edge of the body portion or may extend beyond the same if desired, or may be omitted entirely.

While several embodiments of the invention have been shown and described, it is understood that the invention is not limited to such constructions, but within the scope of the appended claims is capable of various changes and modifications.

I do not herein specifically claim the structure herein described with reference to Fig. 8; that is to say, a sheet metal nut wherein the extension or neck is formed within the body portion, being threaded on either or both sides; and such nut having an annular recess which receives a filling piece and packing washer, or either alone; such structure being claimed in my divisional application for patent filed April 22, 1918, Serial No. 229,899.

What I claim is:—

1. A nut formed of sheet metal and having a body portion and an exteriorly screw-threaded extension, said nut having an opening completely through it, and having a cut interior thread adapted to engage a bolt or the like.

2. A nut formed of sheet metal and having a body portion and an exteriorly screw-threaded extension, said nut having an opening completely through it, and having a cut interior thread adapted to engage a bolt or the like, and said extension projecting beyond said body portion.

3. A nut formed of sheet metal and having a body portion and an extension, said nut having an opening completely through it, and said extension being screw-threaded on its interior and exterior, the opening through the nut being at least as large as the diameter of the interior threaded bore.

4. A nut formed of sheet metal and having a portion thereof of metal folded to form a double thickness, said portion being screw-threaded on its exterior.

5. A nut formed of sheet metal and having an extension folded to form a double thickness of metal, said extension being screw-threaded on its exterior.

6. A nut formed of sheet metal and having a body portion having wrench faces and said nut having an extension folded to form a double thickness of metal, said extension being screw-threaded on its interior.

7. A nut formed of sheet metal and having a body portion having wrench faces and said nut having an extension folded to form a double thickness of metal, said extension being screw-threaded on its interior, and its exterior.

8. A nut formed of sheet metal and having a body portion formed with wrench faces and an extension projecting therefrom, said extension being of metal folded to form a double thickness of material.

9. A nut formed of sheet metal and having a body portion formed with wrench faces and an extension projecting therefrom, said extension being of metal folded to form a double thickness of material, and said extension being screw-threaded on its interior and exterior.

10. A nut formed of sheet metal having wrench faces and a screw-threaded portion of less diameter than the wrench faces, whereby a recess is formed of greater diameter than said screw-threaded portion, and a filling piece in said recess.

11. A nut formed of sheet metal having wrench faces and a screw-threaded portion of less diameter than the wrench faces, whereby a recess is formed of greater diameter than said screw-threaded portion, and a sheet metal filling piece in said recess.

12. A nut formed of sheet metal having wrench faces and a screw-threaded portion of less diameter than the wrench faces, whereby a recess is formed of greater diameter than said screw-threaded portion, and a sheet metal filling piece in said recess, said sheet metal filling piece having inner and outer flanges.

13. A nut formed of sheet metal having wrench faces and a screw-threaded extension of less diameter than said wrench faces whereby there is formed an annular recess, said extension projecting from the body portion and having inner and outer screw-threads, and a sheet metal filling piece in said recess.

14. A sheet metal nut having a body portion having wrench faces, a flat portion forming an annular recess with said body portion for the reception of a washer, and a cylindrical portion at right angles to said flat portion, and a washer in said recess, said recess being open and accessible so that such washer may be applied to and removed therefrom.

15. A sheet metal structure having a central perforation, a body portion and a flange at right angles to the body portion, a sheet metal filling piece resting inside said flange, and a washer resting against said filling piece.

16. A sheet metal structure having a body portion, and a cylindrical portion in substantially axial alinement therewith, the body portion being of greater diameter than the cylindrical portion so as to form an annular recess, and a washer in said recess, having a greater internal diameter than said cylindrical portion, and said recess being open and accessible so that such washer may be applied to and removed therefrom.

17. A sheet metal nut having a body portion, and a screw-threaded cylindrical portion in substantially axial alinement therewith, the body portion being of greater diameter than the cylindrical portion so as to form an annular recess, and a washer in said recess having a greater internal diameter than said cylindrical portion, and said recess being open and accessible so that such washer may be applied to and removed therefrom.

In witness whereof, I have hereunto signed my name in the presence of two subscribing witnesses.

HENRY P. KRAFT.

Witnesses:
  E. V. MYERS,
  FRED WHITE.